(12) United States Patent
Balayn et al.

(10) Patent No.: US 6,276,633 B1
(45) Date of Patent: Aug. 21, 2001

(54) CONVERTIBLE AIRCRAFT WITH TILTING ROTORS

(75) Inventors: Frédéric Balayn; Eric Magre, both of Vitrolles (FR)

(73) Assignee: Eurocopter (FR)

(*) Notice: Subject to any disclaimer, the term of this patent is extended or adjusted under 35 U.S.C. 154(b) by 0 days.

(21) Appl. No.: 09/410,381

(22) Filed: Sep. 30, 1999

(30) Foreign Application Priority Data

Mar. 25, 1999 (FR) .................................................. 99 03735

(51) Int. Cl.$^7$ ........................... B64D 27/00; B64D 29/00; B64C 27/22
(52) U.S. Cl. ........................... 244/56; 247/7 R; 247/7 C
(58) Field of Search .................... 244/7 R, 7 C, 244/56; 901/26

(56) References Cited

U.S. PATENT DOCUMENTS

| | | | | |
|---|---|---|---|---|
| 3,089,666 | * | 5/1963 | Quenzler | 244/7 R |
| 4,831,893 | * | 5/1989 | Obama et al. | 74/490.05 |
| 5,046,914 | * | 9/1991 | Holland et al. | 414/706 |
| 5,054,716 | | 10/1991 | Wilson | 244/56 |
| 5,096,140 | * | 3/1992 | Dornier, Jr. | 244/7 C |
| 5,823,470 | | 10/1998 | Craig | 244/7 R |

OTHER PUBLICATIONS

XP–002106270, Fischer A, Unterhitzenberger J :, << Propulsion system concept for the Eurofar tilt rotor aircraft >>, 16$^{th}$ European Rotor Forum—Glasgow (U.K.).

XP–00210671, Kilmain Charles J, Murray Richard, Huffman Charles :, << V–22 drive system description and design >>, Annual Forum Proceedings—American Helicopter Society—Alexandria (USA).

* cited by examiner

*Primary Examiner*—Charles T. Jordan
*Assistant Examiner*—Christian M. Best
(74) *Attorney, Agent, or Firm*—Piper Marbury Rudnick & Wolfe

(57) ABSTRACT

The convertible aircraft with tilting rotors comprises two fixed wings with zero sweep on which an inter-connecting shaft is substantially rectilinear and parallel with the pivot axis but offset from this axis, substantially perpendicular to a longitudinal axis of symmetry of the aircraft, the center of gravity of which, in helicopter mode, is substantially in a vertical plane passing through the pivot axis and, in aeroplane mode, is substantially contained in or is in proximity to another vertical plane passing through the straight line of the aerodynamic centers of the wings.

13 Claims, 6 Drawing Sheets

CONVERTIBLE AIRCRAFT WITH TILTING ROTORS

The invention relates to a convertible aircraft with tilting rotors, which is capable of operating in helicopter mode, in particular for the purpose of landing and taking off, in which case the rotors rotate about substantially vertical axes in order to lift the aircraft, and in aeroplane mode, in which case the rotors are tilted to operate as propellers, the aircraft comprising at least one fuselage, a fixed wing system comprising at least two wings extending laterally on either side of the fuselage and, in helicopter mode, a rotating wing system comprising at least two rotors which act as propellers in aeroplane mode, and each of which is mounted so that it can tilt about a pivot axis on a respective fixed wing and connected by a respective transmission to a respective engine supported by the corresponding wing, an inter-connecting shaft linking the two transmission in order to drive the two rotors in rotation by any one of the two engines should the other engine fail.

U.S. Pat. No. 5,054,716 describes a convertible aircraft of this type, on which each of the rotors, together with its control means, the corresponding engine and the corresponding transmission, constitutes a tilting unit housed in a pod or nacelle, with the exception of the blades and hub of the rotor, said pod or nacelle being pivotally mounted overhanging the end of a respective fixed wing.

This type of architecture has a number of disadvantages. In particular, not only must each engine be capable of operating in a substantially horizontal position (aeroplane mode), it must also be capable of being started, operated and halted in a substantially vertical position and ensure reliable operation when switching between aeroplane and helicopter modes (whilst the rotors are being tilted). Furthermore, all the cabling, flight control system, hydraulic and fuel lines as well as the inter-connecting shaft must be run through the pivot pin, which has to be supported by means of pivot bearings so that it overhangs at the tip of the wing, which bearings thus support a heavy load, and the design and operation of which are critical. Since the engines are generally turbo-engine units, the jets of gas discharged from their nozzle assist a lift thrust in helicopter mode but have the disadvantage of damaging the surface of the landing and takeoff areas. Furthermore, the fact that each fully pivoting pod needs to be so tightly packed makes it difficult to isolate vital components in this pod to prevent the risk of fire from the engine housed in this pod and the fact that the engine pivots with the pod increases the size of critical zones of the aircraft (surface area of the fuselage and tail) at risk from potential explosion of the rotating components of the turbo-engine.

Finally and above all, a design in which the pods tilt allows no freedom in terms of the position of the inter-connecting shaft, it being crucial for the power takeoffs thereof connecting the ends of this shaft to the transmissions in the tilting pods to be coaxial with the pivot axis. As a result of this architectural constraint, the pivot axis of each pod is positioned towards the rear of the aerodynamic profile of the corresponding wing, i.e. on the chord of the profile at a distance of approximately 55% to approximately 70% of the value of this chord starting from the leading edge of the wing and towards its trailing edge. As a result, the aerodynamic centre of the wings is then too far forward relative to the vertical and transverse plane passing through the centre of gravity of the aircraft in aeroplane mode, which must be compensated by adopting fixed, forward-swept wings (dipping towards the front) in order to move the aerodynamic centre farther back.

It is well known that forward-swept wings are a factor which increases the mass and cost of the fixed wing system and are also not conducive in aerodynamic terms, in particular with regard to the joint between the wings and fuselage, which also makes the inter-connecting shaft complex in structure and expensive.

In practice, in order to adapt to the forward-swept wings, the inter-connecting shaft is a segmented shaft, the structural segments of which are connected by couplings which allow for misalignments.

Another architecture has been proposed as a means of overcoming some of the disadvantages of convertible aircraft having rotors which tilt with their transmission gears and driving engine, in which each of the two transmission gears, mounted between a rotor and the corresponding engine, has a pivoting reduction gear unit linked to a non-pivoting reduction gear unit, whereby the pivoting reduction gear unit drives the corresponding rotor and is mounted so as to pivot with this rotor relative to the non-pivoting reduction gear unit, connected to the inter-connecting shaft and to the corresponding engine and fixed with this shaft and this engine on the corresponding fixed wing.

However, all the designs proposed using this architecture, where tilting rotors linked to engines fixed on the wings by kinematic chains which fold in, have forward-swept wings and as a result have the disadvantages outlined above, in other words the negative effects caused by the structural features on the one hand and by the aerodynamic and aero-elastic features on the other.

The structural aspects are essentially those relating to the complex structure of a forward-swept wing as well as the fuel tank it contains and the complex structure by which the wing is joined to the fuselage.

The aerodynamic and aero-elastic aspects relate to the fact that the aerodynamic centre of a forward-swept wing is shifted forward at high angles of incidence in flight, which tends to destabilise the aircraft on the one hand and, on the other, the fact that the forward sweep tends to amplify what is referred to as "stall flutter", which may mean increasing the rigidity of the fixed wing system on certain aircraft, thereby increasing the mass.

The objective of the invention is to propose a convertible aircraft with tilting rotors, of the type outlined above, in which each transmission has a reduction gear unit which pivots with the corresponding rotor and is connected to a non-pivoting reduction gear rotor, in turn linked to the inter-connecting shaft as well as to the corresponding engine fixed to the corresponding wing, which does not have the disadvantages described above and, more generally, which is better suited to various practical requirements.

To this end, the convertible aircraft with tilting rotors proposed by the invention is characterised in that the fixed wings are wings with a zero sweep, on each of which the inter-connecting shaft is substantially rectilinear and substantially parallel with the pivot axis but offset from said pivot axis substantially perpendicular to a longitudinal axis of symmetry of the aircraft, the centre of gravity of which, in helicopter mode, is substantially contained in a vertical plane passing through the pivot axis whereas in aeroplane mode, the centre of gravity of the aircraft is substantially contained in or in proximity to another vertical plane passing through the straight line of the aerodynamic centres of the zero-sweep wings.

Since the wings have a zero sweep and have mounted on them the engines driving the rotors which pivot on these wings, significant gains are achieved in terms of mass and cost because of the simplified structure of the wings, the fuel tanks which they contain and their connection to the fuselage, as well as a reduction in the effects of "stall flutter" and better flight behaviour at high angles compared with the forward-swept wing designs previously proposed. Furthermore, the balances of the aircraft are more efficiently controlled, given the possibility of using wings with a zero sweep relative to fixed pods housing the engines fixed on these wings, which complies with the requisite balance condition in aeroplane mode, namely that the centre of gravity of the aircraft in aeroplane mode is substantially in or in immediate proximity to a vertical plane passing through the line of aerodynamic centres of the zero-sweep wings and, on the other, the pivot axis of the rotors in order meet the balance condition required for helicopter mode, namely that the centre of gravity of the aircraft in helicopter mode is substantially contained in a vertical plan passing through the pivot axis, without placing any specific constraint on the positioning of the inter-connecting shaft. On each wing, this shaft may therefore be a substantially rectilinear shaft, which simplifies manufacture, limiting the number and complexity of flexible couplings, in the form of a supercritical shaft for example, and this shaft may be positioned parallel with the pivot axis either to the front or the rear of the box-type structure of the corresponding wing, so that the conventional structure of a zero-sweep wing may be retained.

These advantages are in addition to those obtained by mounting the engines in a stationary position relative to the wings, namely the simplicity and low fitting and maintenance costs compared with engines which pivot with the rotors.

Advantageously, the pivoting reduction gear unit of each transmission is arranged in a main helicopter gearbox, comprising an output reduction gear stage, preferably of the epicyclic type, linked to the shaft of the corresponding rotor, and an input reduction gear stage, of the conical ring frame type, in which a conical input gear thereof is coaxial with a pivot gear which pivots about the pivot axis and is joined with said pivot gear in rotation in at least one direction of rotation, the non-pivoting reduction gear unit of each transmission being arranged in an intermediate gearbox comprising a high speed reduction gear stage, having a conical ring frame, the conical input gear of which is linked to an output shaft of the corresponding engine, and an intermediate reduction gear stage meshing with the pivot gear and with the high speed reduction gear stage, and linked to the inter-connecting shaft by a respective power takeoff on the corresponding wing, said intermediate reduction gear stage leaving sufficient space free between the main gearbox and the intermediate gearbox to allow the main gearbox to pivot with the rotor about the pivot axis without interfering with the intermediate gearbox or any other non-pivoting component of the aircraft.

In one variant of the high speed reduction gear stage, which permits an additional reduction, the conical input gear of the high speed reduction gear stage is advantageously linked to the output shaft of the corresponding engine via an additional reduction gear stage having at least two cylindrical gears with straight or helical toothing, reciprocally meshing, one being joined in rotation to the output shaft of the engine and the other to said conical input gear.

In one advantageously simple embodiment, the intermediate reduction gear stage has a first intermediate gear, meshing on the one hand with the pivot gear and on the other with a second intermediate gear joined in coaxial rotation with the conical output gear of the high speed reduction gear stage.

In a first arrangement of the inter-connecting shaft, the latter and the corresponding power takeoff on each wing may be arranged towards the front of the wing relative to the pivot axis, said power takeoff preferably meshing directly with the pivot gear of the corresponding transmission.

In a second arrangement of the inter-connecting shaft, however, the latter and the corresponding power takeoff on each wing are arranged towards the rear of the wing relative to the pivot axis, between the pivot gear and the second intermediate gear, said power takeoff being provided by the first intermediate gear of the corresponding transmission.

In yet another arrangement of the inter-connecting shaft, the latter and the corresponding power takeoff on each wing may be arranged towards the rear of the wing relative to the intermediate stage and said power takeoff preferably meshes directly with the second intermediate gear of the corresponding transmission.

These three layouts, which are relatively compact and incorporate a limited number of gears, offer the advantageous option of providing the pivot gear, the first and second intermediate gears and the power takeoff of the inter-connecting shaft as cylindrical gears.

Furthermore, it is of advantage that these gears and power takeoff are laterally offset, preferably towards the fuselage, relative to a plane containing the axes of the rotor shaft and the output shaft of the engine and are arranged either inside or outside two planes substantially perpendicular to the pivot axis and between which the main gearbox and the associated pivoting rotor pivot, preferably being housed, at least partially, in a profiled connecting part fixed between the corresponding fixed wing and a fixed pod or nacelle, fixed to said wing and accommodating the corresponding engine and at least a part of the intermediate gearbox.

In one design variant of the intermediate reduction gear stage, this latter may comprise an intermediate shaft with an axis substantially perpendicular to the pivot axis, and bearing at least three conical gears, a first of which meshes with the pivot gear, also conical, a second of which meshes with a conical gear joined in coaxial rotation with the conical output gear of the high speed reduction gear stage and a third of which meshes with a conical gear constituting said power takeoff on the inter-connecting shaft.

This being the case and in another arrangement of the inter-connecting shaft, the third conical gear of the intermediate shaft is that of the three conical gears of said intermediate shaft that is located the farthest towards the rear of the wing relative to the pivot gear, providing a larger rear offset of the inter-connecting shaft.

If the intermediate reduction gear stage has such an intermediate shaft with conical gears, it is also of advantage if this intermediate shaft and its conical gears as well as the pivot gear and the corresponding pover takeoff are laterally offset, preferably towards the fuselage, relative to a plane containing the axes of the corresponding rotor shaft and the output shaft of the corresponding engine, and are arranged outside two planes substantially perpendicular to the pivot axis and between which the main gearbox and the associated rotor pivot, preferably being housed, at least partially, in a profiled connecting part fixed between the fixed wing and a fixed pod or nacelle, fixed to the corresponding wing and accommodating the engine and at last a part of the intermediate gearbox.

Since each engine is supported by a fixed structure on the corresponding wing, it is of advantage if, on each wing, the corresponding rotor and main gearbox are pivotally mounted with the help of a pivot pin supported on either side of the main gearbox respectively by one of two pivot bearings housed in two stationary lateral front parts of a stationary pod supporting the corresponding engine and fixed onto the wing.

In this case, on each wing, a pivoting unit comprising at least the corresponding main gearbox, the corresponding rotor shaft and associated control means and a part of at least one pivot actuator, can be advantageously housed in a pivotally mounted front part of a pod between the two stationary lateral front parts of the stationary pod.

Other advantages and features of the invention will become clear from the description of embodiments below, given by way of example and not restrictive in any respect, and with reference to the appended drawings, in which.

Figures 1, 2:
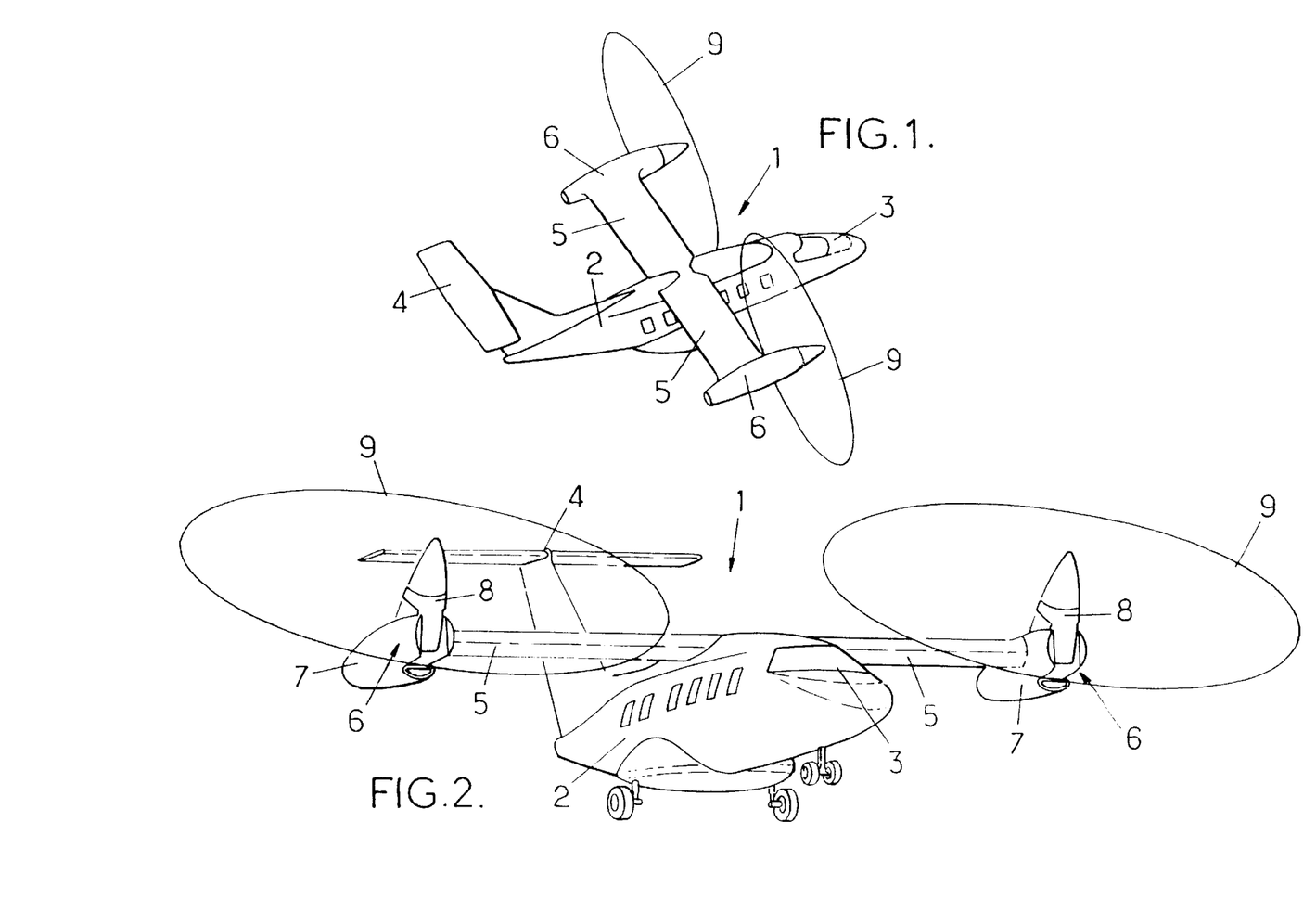
FIGS. 1 and 2 are schematic views of the convertible aircraft in perspective, in aeroplane mode and helicopter mode respectively.
Figure 3:
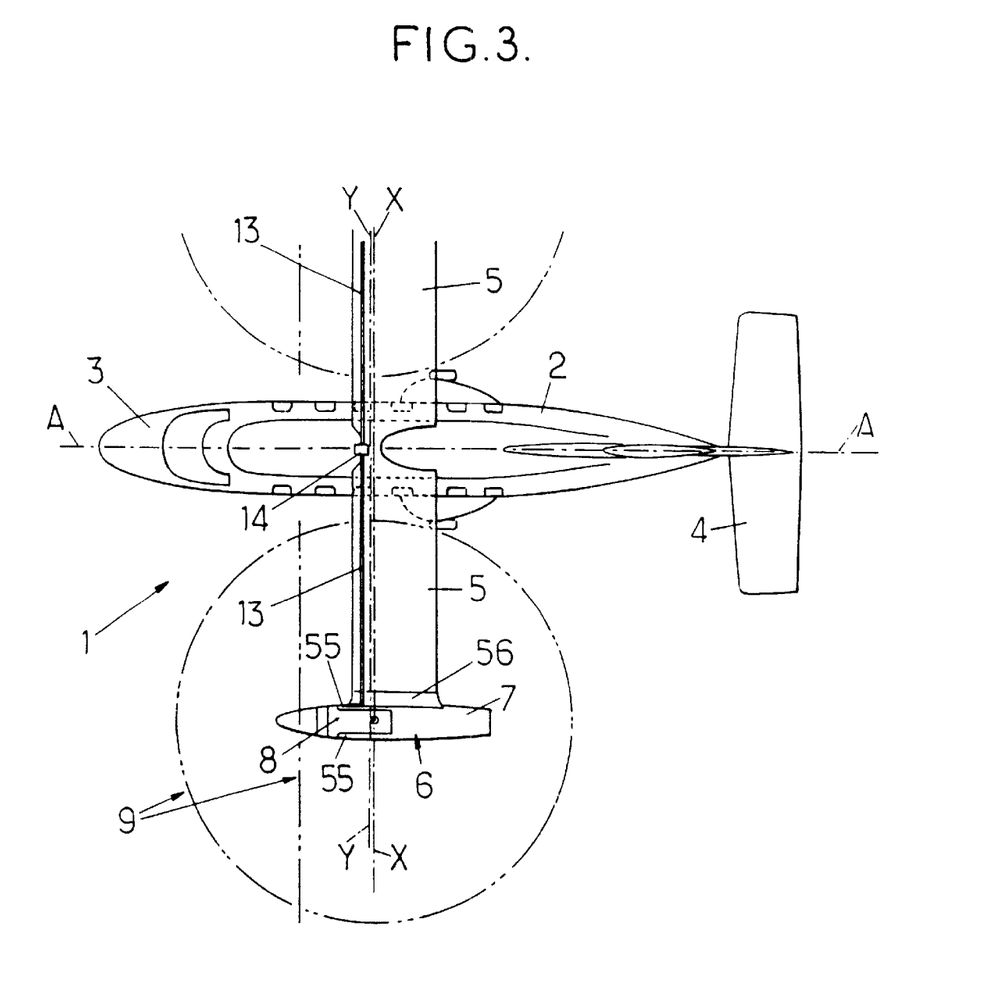
FIG. 3 is a partial schematic illustration in plan view of the aircraft of FIGS. 1 and 2, FIGS. 4a and 4b are schematic views in partial longitudinal section and in partial side elevation of one of the two pods mounted on the wings of the aircraft illustrated in FIGS. 1 to 3 and housing an engine and a transmission linking this engine to a pivoting rotor of the aircraft, in aircraft mode and helicopter mode respectively.

The convertible aircraft 1 illustrated in FIGS. 1 to 3 comprises an aeroplane fuselage 2, with a cockpit 3 at the front and a "T-shaped" tail 4 at the rear and two fixed, top-mounted wings 5 with a zero sweep and constant chord (rectangular in plane) with a pod or nacelle 6 attached by its rear part 7 at the tip of each of the two wings 5, extending laterally at each side of the fuselage 2 in a conventional manner.

Each pod 6 has a front part 8, which is shaped and pivotally mounted relative to the stationary rear part 7 of the pod 6 and hence relative to the corresponding wing 5, about a pivot axis X—X extending transversely to the fuselage 2 and more specifically perpendicular to the longitudinal axis of symmetry A—A of the aircraft 1 and parallel with the straight line Y—Y passing through the aerodynamic centres of the wings 5, slightly to the rear of this line of centres Y—Y, which is located substantially at the front quarter of the chord of the wings 5, i.e. at a distance from the leading edge of the wings 5 which is approximately 25% of the value of the chord of the wings 5 in a direction to the trailing edge of these wings 5 (see FIG. 3).

In each pivoting front part 8 of the pod, a rotor 9 is mounted so as to rotate about its axis and simultaneously pivot about the axis X—X with the corresponding front part of the pod 8, each rotor 9 having, in order to be driven in rotation, a shaft 10, linked via a transmission 11 to a turbo-engine unit 12 fixed in the stationary rear part 7 of the corresponding pod 6, in a layout that will be described in more detail below with reference to FIGS. 4a and 4b.

The convertible aircraft 1 is therefore lifted with two pivoting rotors 9, each of which can be pivoted between a helicopter configuration, in which each rotor 9 is driven about a substantially vertical axis of rotation so that the aircraft can operate in helicopter mode, and an aeroplane configuration in which each rotor constitutes a propeller driven in rotation about an axis substantially aligned with the direction of flight so that the aircraft can operate in aeroplane mode.

In addition, in order to drive the two rotors 9 if either of the turbo-engine units 12 fails and to do so regardless of the inclination of the shaft 10 of the rotors 9 about the pivot axis X—X, the two transmissions 11 are linked to one another by an inter-connecting shaft 13.

If the top-mounted and stationary wings 5, which have a zero sweep, also have a slight or no dihedral, the inter-connecting shaft 13 may be a rectilinear shaft of one to two pieces extending from one pod 6 to the other across the entire span of the fixed wing system, being parallel with the pivot axis X—X but shifted relative to this pivot axis towards the front or towards the rear of the wings 5, as explained below with reference to FIGS. 6 to 10.

If the wings 5 have a significant dihedral, the inter-connecting shaft 13 may be made up of two rectilinear sections, each of which is mounted in one of the wings 5, being parallel with the pivot axis X—X but offset therefrom and hence perpendicular to the longitudinal axis of symmetry A—A of the aircraft 1. In either case, the inter-connecting shaft 13 is coupled with a casing 14 for driving accessories on the upperside of the fuselage 2.

So that each rotor 9 pivoting with the pivoting front part 8 of the corresponding pod 6 can be driven in rotation about the axis of its shaft 10 by the turbo-engine unit 12 in the stationary rear part 7 of its pod 6 or by the inter-connecting shaft 13 driven from the other turboengine unit 12 in the pod 6 of the other wing 5, each transmission 11 has a front reduction gear unit 15, provided as a main helicopter gearbox which drives the shaft 10 of the rotor 9 and is mounted so as to tilt therewith about the pivot axis X—X inside the pivoting front part 8 of the pod 6, the main gearbox 15 remaining permanently meshed with a rear, non-pivoting reduction gear unit 16, permanently meshing with a power takeoff at the corresponding end of the inter-connecting shaft 13 and with an output shaft 17 of the corresponding turbo-engine unit 12. The rear, non-pivoting reduction gear unit 16 is arranged in an intermediate gearbox occupying a fixed position relative to the turbo-engine unit 12, the rear part 7 of the corresponding pod 6, the inter-connecting shaft 13 and hence the two wings 5 and is partly housed in the stationary rear part 7 of the pod 6 and optionally in at least one of the aerodynamically shaped connectors or a linking fillet between the corresponding stationary rear part 7 of the pod and the wing 5.

Figure 4A:
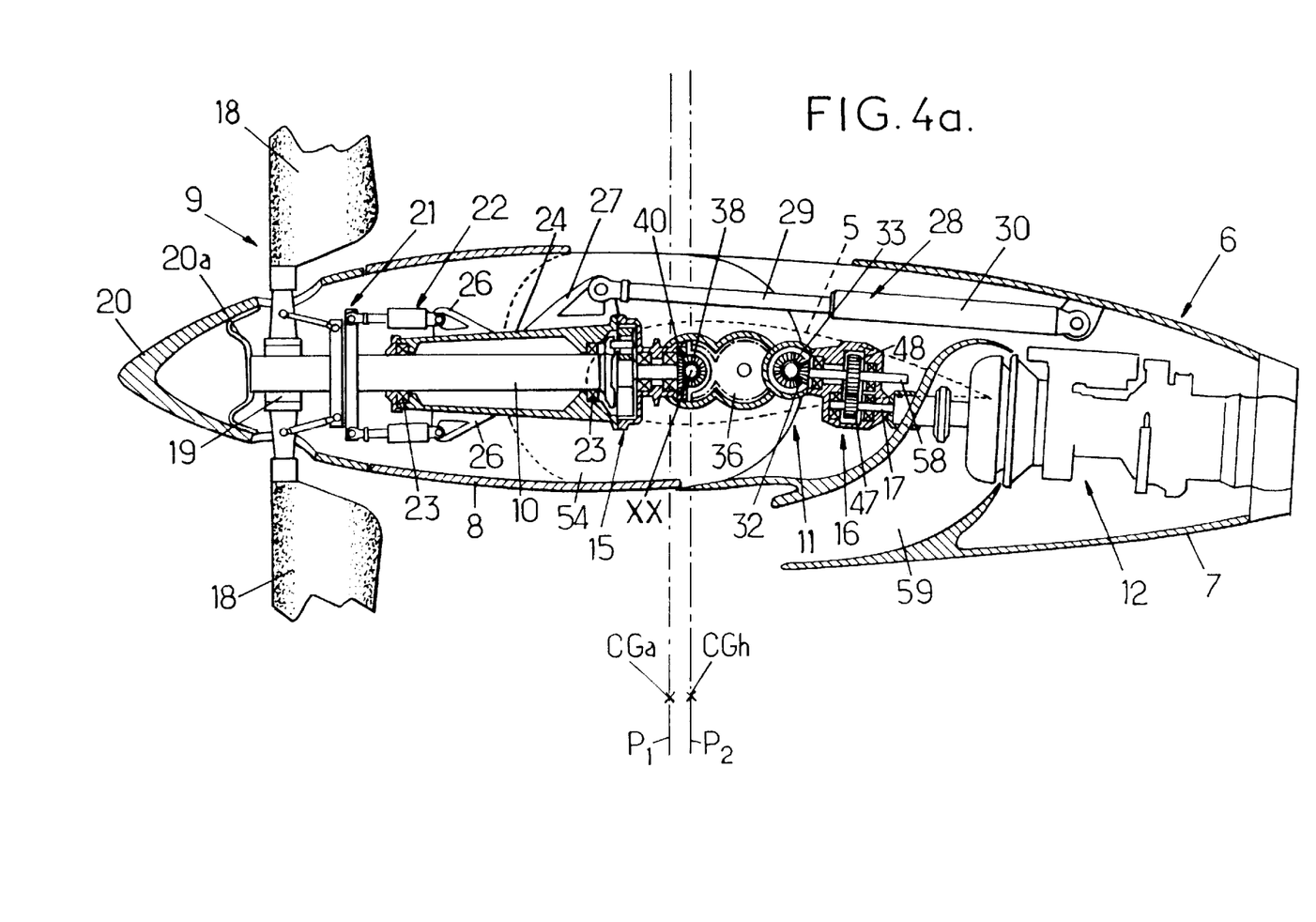
Figure 4B:
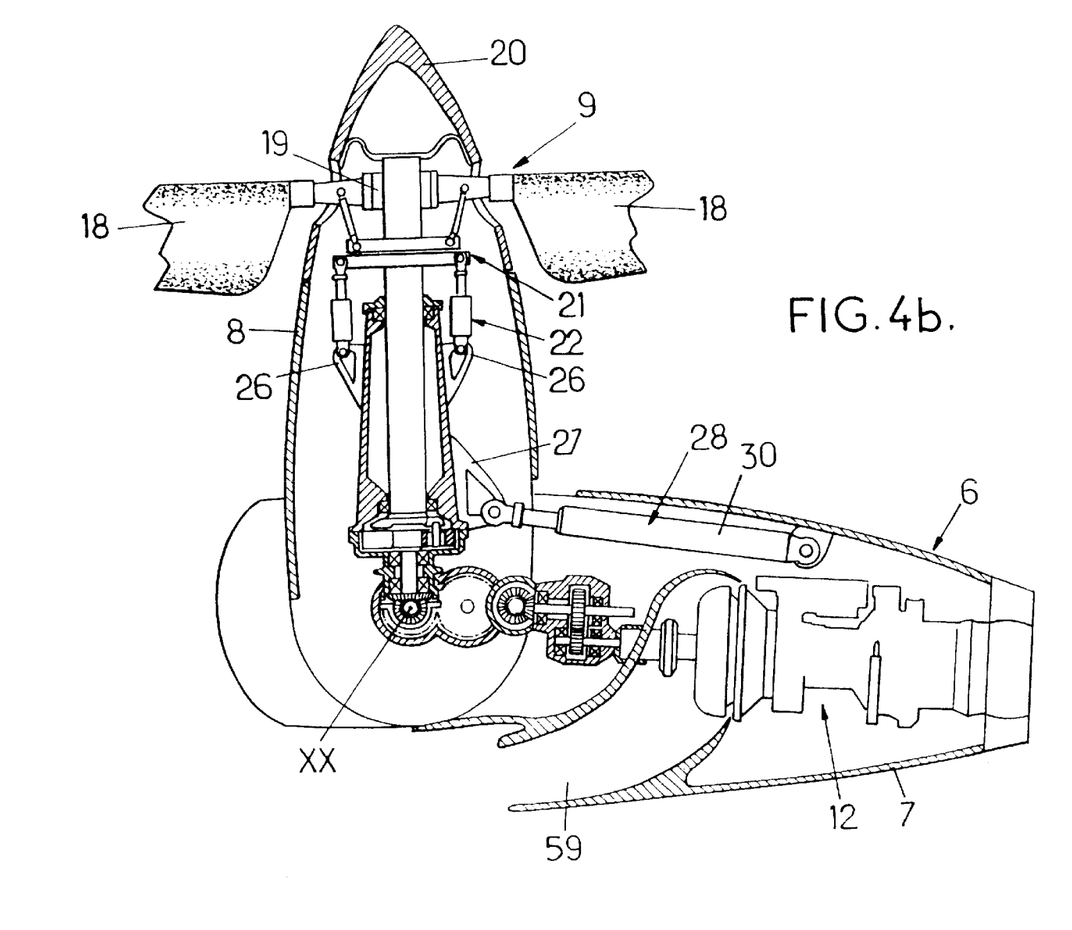

In FIGS. 4a and 4b, the blades 18 of each rotor 9 are retained by their root on a hub 19 which is joined to one end of the shaft 10 of the rotor 9 in rotation, inside a dome 20 retained on this end of the shaft 10 by means of a flange 20a and driven in rotation therewith, and having orifices crossed through by the roots of the blades 18 articulated around a pitch axis in a conventional way for a helicopter rotor, the pitch thereof being controlled by servo-controls having a swash plate device 21 of a conventional structure and control-driven actuators 22, which are housed in the pivoting front part 8 of the pod and underneath the dome 20, shaped to close off the open front end of the pivoting part 8 of the pod in a continuous aerodynamic design. The shaft 10 is mounted so as to rotate with the aid of bearings 23 in a housing 24 disposed in the front, pivoting part 8 of the pod and fixed to this part 8 and mounted so as to pivot about the pivot axis X—X by means of a pivot pin 25 (FIG. 6), and the shaft 10 is driven in rotation inside the housing 24 by means of the main gearbox 15 housed in the base of this housing 24. On the side of the hub 19, the housing 24 has three feet 26 providing an articulated link for the three pilot-control actuators 22, also articulated on the non-rotating plate of the swash plate device 21, the rotating plate of which is linked by means of pitch change rods to blade pitch levers 18, in a manner conventionally used for helicopter rotors. Towards its base, the housing 24 has one or two anchoring feet 27, on which or on each of which the end of the rod 29 of an actuator 28 or respectively one of two pivot actuators 28 of the rotor 9 is mounted in an articulated link, the or each actuator 28 possibly being provided in the form of a hydraulic or electric jack, the cylinder 30 of which is articulated on a linkage fixed to the interior of the stationary, rear part 7 of the pod. Accordingly, the rotors 9 are pivoted from the position assumed in aeroplane mode to the position assumed in helicopter mode by means of, for each rotor 9, a pivot actuator 28 or two parallel actuators 28, fully integrated in the corresponding pod 6.

The main gearbox 15 and the intermediate gear box 16 of the transmission 11 illustrated in FIGS. 4a and 4b are those of the variant described below with reference to FIG. 7, the operating principle of a transmission 11 being described with reference to FIGS. 5 and 6.

Figures 5, 7:
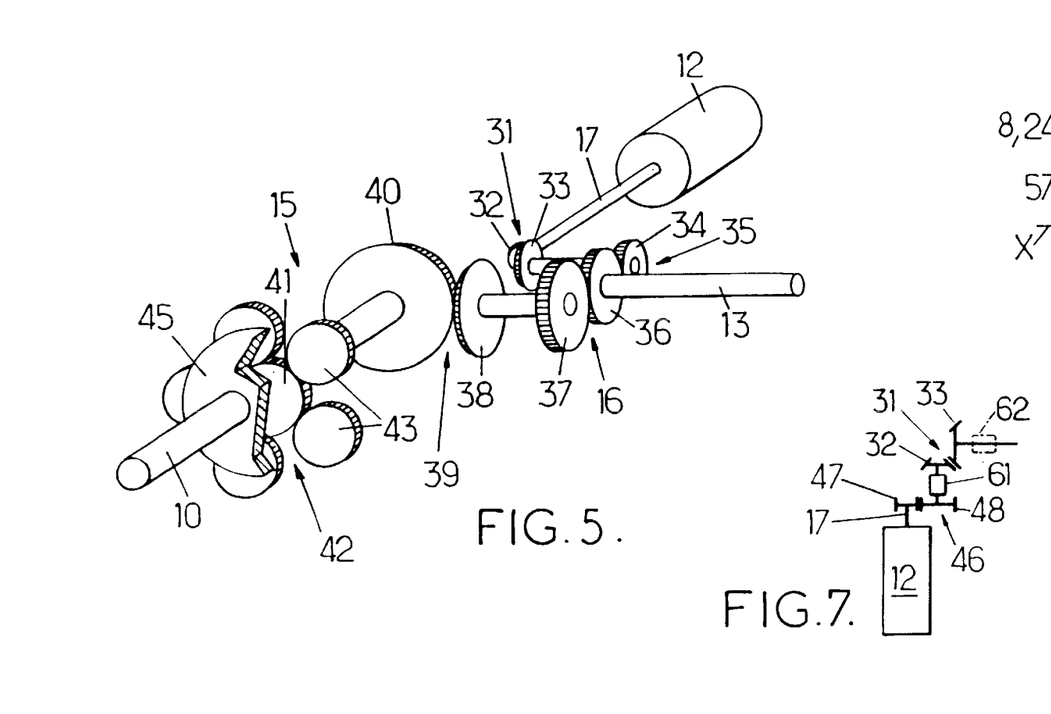
FIG. 5 is an operating diagram of a transmission linking an engine and a rotor shaft.
FIG. 7 is a partial operating diagram of a variant of the unit illustrated in FIG. 6, and FIGS. 8, 9 and 10 are operating diagrams similar to that of FIG. 6 but incorporating three variants of the transmission.
Figure 6:
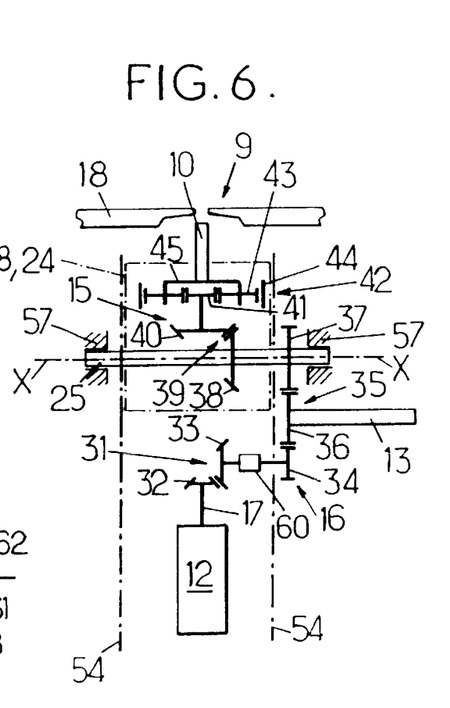
FIG. 6 is an operating diagram of an engine-transmission rotor unit having the transmission illustrated in FIG. 5.

FIGS. 5 and 6 illustrate a turbo-engine unit 12, the output shaft 17 of which is joined in coaxial rotation about its axis to a conical input gear 32 of a conical ring frame 31 of a high-speed reduction gear stage which re-centres the engine 12 and reduces rotation speed, the conical output gear 33 of which is joined in coaxial rotation, about an axis perpendicular to that of the output shaft 17, to a cylindrical gear 34 having straight or helical teeth. This cylindrical gear 34 is a gear of an intermediate reduction gear stage 35, also belonging to the intermediate gearbox 16 and which has another cylindrical intermediate gear 36, meshing with the cylindrical intermediate gear 34 and, in this example, simultaneously constituting a power takeoff at the end of the inter-connecting shaft 13. This cylindrical gear 36 simultaneously meshes with another cylindrical gear 37, towards the front of the corresponding wing 5, which is a pivot gear mounted so as to pivot about the pivot pin 25 in coaxial rotation about the pivot axis X—X The pivot gear 37 is in turn joined in coaxial rotation, about the pivot axis X—X, to a conical input gear 38 of a conical ring frame 39 constituting the input reduction gear stage of the main gearbox 15, the function of which is to transmit the rotary driving motion across the pivot axis X—X, adjusting the rotation speed. The conical output gear 40 of the input reduction gear stage 39 is in turn joined in coaxial rotation, about the axis of the shaft 10 of the rotor 9, to a planetary gear 41 of an output reduction gear stage of the epicyclic type 42 of the main gearbox 15, this epicyclic stage 42 providing, in a known manner on main gearboxes of helicopters, a high reduction ratio in a minimum volume with the aid of satellites 43 rolling inside a toothed outer annular gear 44 and about the planetary gear 41, whilst a planet pinion cage 45 is joined in rotation to the rotor shaft 10.

In this transmission, an important function of the intermediate stage 35 is to keep sufficient space free between the high speed reduction gear stage 31 and the input stage 39 of the main gearbox 15 to guarantee that the main gearbox 15 will be able to pivot with the rotor 9 about the pivot axis X—X without interfering with the intermediate gearbox 16 and any other non-pivoting member which might be housed in the pod 6, for example equipments of the turbo-engine unit 12.

In the variant illustrated in FIG. 7, which corresponds to the transmission 11 of FIGS. 4a and 4b, the conical input gear 32 of the high speed reduction gear stage 31 is not directly driven in rotation by the output shaft 17 of the turboengine unit 12 but is linked to this output shaft 17 via an additional input reduction gear stage 46 with two straight or helically toothed cylindrical gears 47 and 48 meshing with one another, one 47 of which is joined in coaxial rotation with the output shaft 17 whilst the other 48 is joined in coaxial rotation with the conical input gear 32 of the reduction gear stage 31.

In order to neutralise the differences between the rotation speeds of the shafts 17, a freewheel is incorporated in each transmission 11 and more specifically in each intermediate gearbox 16. For optimum function, this freewheel is advantageously disposed after the first reduction gear stage. Accordingly, the freewheel 60 in FIG. 6 is mounted between the gears 33 and 34 and the freewheel 61 in FIG. 7 is mounted between the gears 48 and 32. As a variant, however, in FIG. 7 (as in FIG. 6), the freewheel 62 may be mounted between the gears 33 and 34.

In the transmissions illustrated in FIGS. 6 and 7, in other words those of FIGS. 4a and 4b, the intermediate gear 36 of the intermediate stage 35 is simultaneously the power take-off or an inter-connecting gear for an inter-connecting stage linking the intermediate gearbox 16 of the transmission 11 with the inter-connecting shaft 13, thus disposed towards the rear of the wing 5, relative to the pivot axis X—X and more specifically between the pivot gear 37 and the intermediate gear 34 joined in rotation to the output stage of the high speed reduction gear stage 31. However, since the inter-connecting shaft 13 is linked to the intermediate gearbox 16 and not to the pivot gear 37, the inter-connecting shaft 13 may be placed towards the front or towards the rear of the aerodynamic profile of the wing 5, which can be seen in FIG. 4a, without substantially effecting the overall architecture of the pod 6.

Accordingly, the profile of the wing 5 and hence the wing 5 as a whole, since it is a wing with a zero sweep, may be displaced in the direction of the chord of the wing 5 or in the longitudinal direction of the pod 6 relative to the pivot axis X—X so as to meet two conditions of equilibrium, these being that in aeroplane 10 mode (FIGS. 1 and 4a), the centre of gravity of the aircraft CGa is contained in a vertical plane P1 or is in immediate proximity of this vertical plane P1 containing the straight line passing through the aerodynamic centres of the wings 5 on the one hand and, on the other, that in helicopter mode (FIGS. 2 and 4b), the centre of gravity of the aircraft CGh is contained in a vertical plane P2 passing through the pivot axis X—X of the aircraft (see FIGS. 4a and 4b). These centring positions of the aircraft enable the control commands of the aircraft to be simplified in aeroplane mode.

Figure 8:
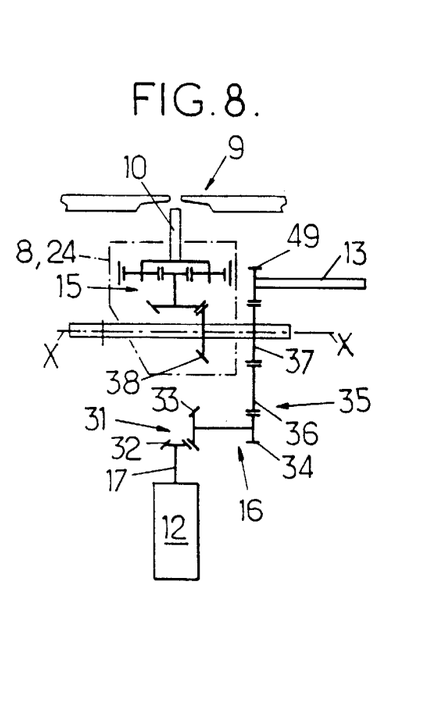

If the inter-connecting shaft 13 must be disposed towards the front of the wing 5, for example in front of the box-type structure of the wing system (not illustrated), the intermediate gearbox 16 used may be that of FIG. 8, on which elements similar to those of FIG. 6 are shown by the same reference numerals. The transmission of FIG. 8 essentially differs from that illustrated in FIG. 6 only due to the fact that the inter-connecting shaft 13 is linked to the intermediate gearbox 16 by an inter-connecting stage comprising an additional cylindrical gear 49 in front of the pivot gear 37 and meshing directly with this latter, which in turn meshes with the intermediate gear 36 of the intermediate stage 35, as illustrated in FIG. 6.

As a variant, the inter-connecting shaft 13 may be farther towards the front of the wing 5 relative to the pivot axis X—X if an inter-connecting stage is incorporated, comprising another cylindrical gear, forming the power takeoff at the end of the shaft 13 and meshing on the front of the cylindrical gear 49.

Figure 9:
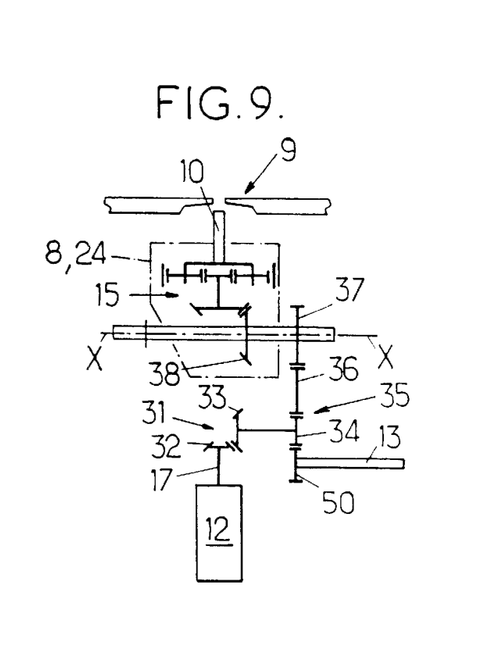

If, however, the inter-connecting shaft 13 has to be disposed very much to the rear of the pivot axis X—X, towards the trailing edge of the wing 5, and therefore behind the box-type structure of the wing system, the transmission used may be that illustrated in FIG. 9, on which all the elements common to FIGS. 6 and 8 are shown by the same reference numerals. The transmission of FIG. 9 differs from that of FIG. 8 only as regards the arrangement of the inter-connecting shaft 13 to the rear not only of the pivot axis X—X but also of the two intermediate gears 36 and 34, the power takeoff at the end of the shaft 13 being constituted by an additional cylindrical gear 50 directly meshing with the intermediate gear 34 to the rear thereof.

As a variant and if the shaft 13 is even farther back, the power takeoff at its end may be another cylindrical inter-connecting gear meshing on the rear of the inter-connecting gear 50 in an inter-connecting stage having two cylindrical gears.

An advantage of the transmission illustrated in FIGS. 6, 7, 8 and 9 is the fact that the pivot gear 37, the intermediate gears 34 and 36 and the inter-connecting gear or gears such as 49 and 50 are cylindrical gears, which is more economical.

Figure 10:
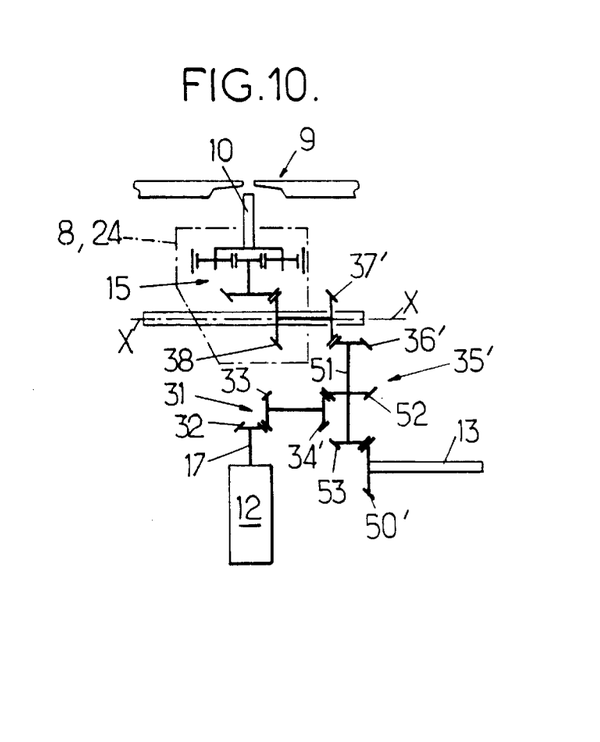

However, it is also possible to provide an intermediate reduction gear stage together with the pivot and inter-connecting gears with conical gears, such as with the transmission illustrated in FIG. 10, the elements common to those of FIGS. 6 to 9 being shown by the same reference numerals. The transmission illustrated in FIG. 10 essentially differs from that of FIG. 9 due to the fact that the intermediate reduction gear stage 35' comprises an intermediate shaft 51, the axis of which is substantially perpendicular to the pivot axis X—X and as a result substantially parallel with the axis of the output shaft 17 of the turbo-engine unit 12. This intermediate shaft 51 is joined in coaxial rotation about its axis with three conical gears which it bears. A first conical gear 36' of the shaft 51 is an intermediate conical gear meshing with the pivot gear 37', which is also conical in this example. A second intermediate conical gear 52, on the intermediate shaft 51 to the rear of the conical gear 36' meshes with a conical gear 34' joined in coaxial rotation with the conical output gear 33 of the high speed reduction gear stage 31. The third conical gear 53 of the intermediate shaft 51 meshes with a conical gear 50' forming the power takeoff on the corresponding end of the inter-connecting shaft 13. If the shaft 13 has to be arranged to the front of the pivot axis X—X, the third conical gear 53 is joined to a part of the intermediate shaft 51 extending in front of the pivot gear 37', so that the conical gear 36' is positioned between the conical gears 53 and 52, from the front to the rear of the corresponding wing 5. If, on the other hand, the inter-connecting shaft 13 must be arranged to the rear not only of the pivot axis X—X but also of the high speed reduction gear stage 31, in order to obtain a greater offset towards the rear of the shaft 13, the conical gear 53 is the farthest to the rear of the three conical gears of the intermediate shaft 51 relative to the pivot gear 37' and hence relative to the wing 5, as illustrated in FIG. 10.

Although no freewheel is illustrated in FIGS. 8 to 10, the corresponding transmissions have such a freewheel, arranged as illustrated in examples in FIGS. 6 and 7.

Regardless of whether the pivot gears, the gears of the intermediate reduction gear stage and inter-connecting stage are conical and joined in rotation with an intermediate shaft in the case of the intermediate gears, as illustrated in FIG. 10 or whether these gears are cylindrical as illustrated in FIGS. 6 to 9, these gears are laterally offset relative to the plane defined by the axis of the shaft 10 of the corresponding rotor 9 and by the axis of the output shaft 17 of the corresponding turbo-engine unit 12 (these two axes being coplanar and perpendicular to the pivot axis X—X) to the point that these different gears, such as 37, 36 and 34 in FIG. 6, are either inside or outside the volume delimited between two planes 54 represented by dashed-dotted lines in FIG. 6, perpendicular to the pivot axis X—X, and between which the main gearbox 15, the shaft 10 of the associated rotor 9 as well as the housing 24 and the front part 8 of the corresponding pod pivot about the pivot axis X—X and relative to the turbo-engine unit 12 arranged between these two planes 54 and fixed in the stationary rear part 7 of the pod. These two pivot planes 54 are defined by the vertical flanks, inside the pod 6, of two stationary lateral front parts 55 (see FIG. 3) laterally extending the stationary rear part 7 of the corresponding pod 6 towards the front, the central and rear portion of the pivoting front part 8 of the pod being pivotally mounted precisely between these stationary lateral front parts 55.

The laterally offset gears are preferably on the side of the fuselage 2 so as not to load the end of the wing 5 and these gears are housed, either wholly or partially, in the stationary lateral front part 55 on the side of the fuselage 2 or alternatively in a stationary profiled connector 56 (see FIG. 3) of the wing fillet type, providing the connection between the wing 5 and the stationary rear part 7 of the pod.

As illustrated schematically in FIG. 6, in order to avoid mounting the pivot pin 25 in an overhanging position, this latter is supported, on each wing 5, on either side of the corresponding main gearbox 15 and outside the volume delimited between the two pivot planes 54 by one of two pivot bearings 57, schematically illustrated as plain bearings but which may also be provided in the form of roller bearings, housed in the two stationary lateral front parts 55 of the pod 6. Accordingly, the conical input gear 38 of the input stage 39 of the main gearbox 15 as well as the pivot gear 37 or 37' are annular gears, pivotally mounted about the pivot pin 25. Furthermore, the pivot bearing 57 on the side of the pivot gear 37 or 37' relative to the main gearbox 15 may be mounted between the gears 38 and 37 or 37' if this bearing 57 is in the corresponding stationary lateral front part 55 whilst the pivot gear 37 or 37' is housed in the corresponding profiled connector 56.

Accordingly, for each of the two pods 6, a pivoting arrangement is provided comprising the corresponding main gearbox 15, the shaft 10 of the corresponding rotor 9 as well as its associated control means 21, 22, and the rod 29 of the pivot actuator or actuators 28, this pivoting arrangement being housed in the front part 8 of the pod 6, this front part 8 being pivotally mounted with the housing 24 between the two stationary lateral front parts 55 of the stationary rear part 7 of the pod 6. As a result, advantageous use is made of the stationary structure (the fixed parts 7 and 55 of the pod 6) incorporating the turbo-engine unit 12 to encase the pivoting front part 8 laterally, which enables the pivot pin 25 to be incorporated on either side of this pivoting part 8 which avoids mounting in an overhanging position, thereby limiting the stress on the pivot bearings 57.

It should be pointed out that the inter-connecting stage comprising the gears 36, 49, 50 and 50' in the transmissions of FIGS. 6 and 10, and which is housed in the profiled connector 56 between the wing 5 and the pod 6 so as to avoid generating additional aerodynamic drag, not only allows the inter-connecting shaft 13 to be linked to the intermediate gearbox 16 compensating for the relative positions between this shaft 13 and this gearbox 16 but also to drive a certain number of pieces of equipment, in particular hydraulic equipment, due to the speed of the inter-connecting shaft 13. This can be achieved by incorporating an additional gear (not illustrated) meshing with an inter-connecting gear and on the shaft of which a power takeoff is provided in order to drive hydraulic pumps, for example.

Similarly, electrical equipment, co-operating in particular with the turbo-engine unit 12, may be driven by the high speed reduction gear stage 31, on which an output 58 (see FIG. 4a) is provided (with a rotation speed of approximately 12000 revolutions per minute, for example), this output 58 being an extension of the shaft which joins the straight gear 48 of the additional reduction input gear stage 46 in coaxial rotation with the conical input gear 32 of the high speed stage 31 in the transmission illustrated in FIG. 7. The accessories driven by this output shaft 58 are also arranged in the stationary rear part 7 of the pod 6.

Underneath the high speed reduction gear stage 31 of the transmission 11, this stationary rear part 7 of the pod 6 also has an air inlet 59 for the turbo-engine unit 12. The fixed position of this latter in the stationary rear part 7 of the pod 6 significantly simplifies fitting and maintenance of the turbo-engine unit 12, the circuits (fuel, hydraulic, electrical, . . . ) associated therewith and the retaining structure, and a fire-resistant partition of a simple structure may be used to isolate the turbo-engine unit 12. The aircraft can easily be protected against the risk of explosion by the rotating components of the turbo-engine and the unpleasant effects of the combustion gas jets discharged from the nozzle of the turbo-engine unit 12 and directed towards the ground are avoided.

What is claimed is:

1. A convertible aircraft with tilting rotors, which is capable of operating in aeroplane mode and in helicopter mode and comprising at least one fuselage, a fixed wing system comprising at least two wings extending laterally on either side of said fuselage, and, in helicopter mode, a rotating wing system comprising at least two rotors which act as propellers in aeroplane mode, each of which is mounted so as to be tiltable about a pivot axis on a respective fixed wing and connected by a respective transmission to a respective engine supported by the corresponding wing, an inter-connecting shaft linking the two transmission gears in order to drive the two rotors in rotation by any one of the two engines should the other engine fail, each of the two transmissions having a pivoting reduction gear unit connected to a non-pivoting reduction gear unit, the pivoting reduction gear unit driving the corresponding rotor and being mounted so as to pivot with said rotor relative to the non-pivoting reduction gear unit, linked to said inter-connecting shaft and to said corresponding engine and fixed with said shaft and said engine on the fixed wings, wherein said fixed wings are zero-sweep wings, on each of which the inter-connecting shaft is substantially rectilinear and substantially parallel with the pivot axis but offset from said pivot axis substantially perpendicular to a longitudinal axis of symmetry of the aircraft, the center of gravity of which, in helicopter mode is substantially contained in a vertical plane passing through the pivot axis whilst in aeroplane mode, the center of gravity of the aircraft is substantially contained in or in proximity to another vertical plane passing through the straight line of the aerodynamic centers of the zero-sweep wings, wherein the pivoting reduction gear unit of each transmission is arranged in a main helicopter gearbox, comprising an output reduction gear stage linked to the shaft of the corresponding rotor, and an input reduction gear stage, of the conical ring frame type, in which a conical input gear thereof is coaxial with a pivot gear which pivots about the pivot axis and is joined with said pivot gear in rotation in at least one direction of rotation, the non-pivoting reduction gear unit of each transmission being arranged in an intermediate gearbox comprising a high speed reduction gear stage, having a conical ring frame, the conical input gear of which is linked to an output shaft of the corresponding engine, and an intermediate reduction gear stage meshing with the pivot gear and with the high speed reduction gear stage, and linked to the inter-connecting shaft by a respective power takeoff on the corresponding wing, said intermediate reduction gear stage leaving sufficient space free between the pivoting reduction gear unit and the intermediate gearbox to allow the pivoting reduction gear unit to pivot with the rotor about the pivot axis without interfering with the intermediate gearbox or any other non-pivoting component of the aircraft.

2. A convertible aircraft as claimed in claim 1, wherein the conical input gear of the high speed reduction gear stage is linked to the output shaft of the corresponding engine via an additional reduction gear stage, having at least two cylindrical gears, with straight or helical toothing, reciprocally meshing, one being joined in rotation to the output shaft of the engine and the other to said conical input gear.

3. A convertible aircraft as claimed in claim 1, wherein the intermediate reduction gear stage has a first intermediate gear, meshing on the one hand with the pivot gear and on the other with a second intermediate gear joined in coaxial rotation with the conical output gear of the high speed reduction gear stage.

4. A convertible aircraft as claimed in claim 3, wherein for each transmission, the inter-connecting shaft and the corresponding power takeoff are arranged towards the front of the wing relative to the pivot axis.

5. A convertible aircraft as claimed in claim 3, wherein for each transmission, the inter-connecting shaft and the corresponding power takeoff are arranged towards the rear of the wing relative to the pivot axis, between said pivot gear and the second intermediate gear, said power takeoff being constituted by the first intermediate gear.

6. A convertible aircraft as claimed in claim 3, wherein for each transmission, the inter-connecting shaft and the corresponding power takeoff are arranged towards the rear of the wing relative to the intermediate stage.

7. A convertible aircraft as claimed in claim 3, wherein the pivot gear, the first and second intermediate gears and said power takeoff of the inter-connecting shaft are cylindrical gears.

8. A convertible aircraft as claimed in claim 3, wherein for each transmission, the pivot gear, the first and second intermediate gears and the corresponding power takeoff on the inter-connecting shaft are laterally offset towards the fuselage, relative to a plane containing the axes of the shaft of the rotor and the output shaft of the engine and are arranged outside two planes substantially perpendicular to the pivot axis and between which the pivoting reduction gear unit and the associated rotor pivot said pivot and intermediate gears and power takeoff being housed, at least partially, in a profiled connector fixed between the corresponding fixed wing and a fixed pod, fixed to said wing and accommodating the corresponding engine and at least a part of the intermediate gearbox.

9. A convertible aircraft as claimed in claim 1, wherein for each transmission, the intermediate reduction gear stage comprises an intermediate shaft with an axis substantially perpendicular to the pivot axis, and bearing at least three conical gears, a first of which meshes with the pivot gear, also conical, a second of which meshes with a conical gear joined in coaxial rotation with the conical output gear of the high speed reduction gear stage and a third of which meshes with a conical gear constituting said power takeoff on the inter-connecting shaft.

10. A convertible aircraft as claimed in claim 9, wherein the third conical gear of the intermediate shaft is that one of the three conical gears of said intermediate shaft that is located the farthest towards the rear of the wing relative to the pivot gear so as to provide a larger rear offset of the inter-connecting shaft.

11. A convertible aircraft as claimed in claim 9, wherein the intermediate shaft and its conical gears as well as the pivot gear and the corresponding power takeoff are laterally offset towards the fuselage, relative to a plane containing the axes of the corresponding shaft of the rotor and the output shaft of the corresponding engine, and are arranged outside two planes substantially perpendicular to the pivot axis and between which the pivoting reduction gear unit and the associated rotor pivot, said conical and pivot gears and power take off being housed, at least partially, in a profiled connector fixed between the fixed wing and a fixed pod, fixed to the corresponding wing and accommodating the engine and at least a part of the intermediate gearbox.

12. A convertible aircraft as claimed in claim 1, wherein on each wing, the corresponding rotor and pivoting reduction gear unit are pivotally mounted by means of a pivot pin, supported on either side of the pivoting reduction gear unit respectively by one of two pivot bearings housed in two stationary lateral front parts of a fixed pod, bearing the corresponding engine and fixed onto the wing.

13. A convertible aircraft as claimed in claim 12, wherein on each wing, a pivoting unit comprising at least the corresponding pivoting reduction gear unit, the shaft of the corresponding rotor and associated control means and a part of at least one pivot actuator is housed in a front part of the pod, pivotally mounted between the two stationary lateral front parts of the fixed pod.

* * * * *